March 9, 1965  A. C. SINCLAIR ETAL  3,172,351
COTTON PRESS
Filed April 30, 1962  4 Sheets-Sheet 1
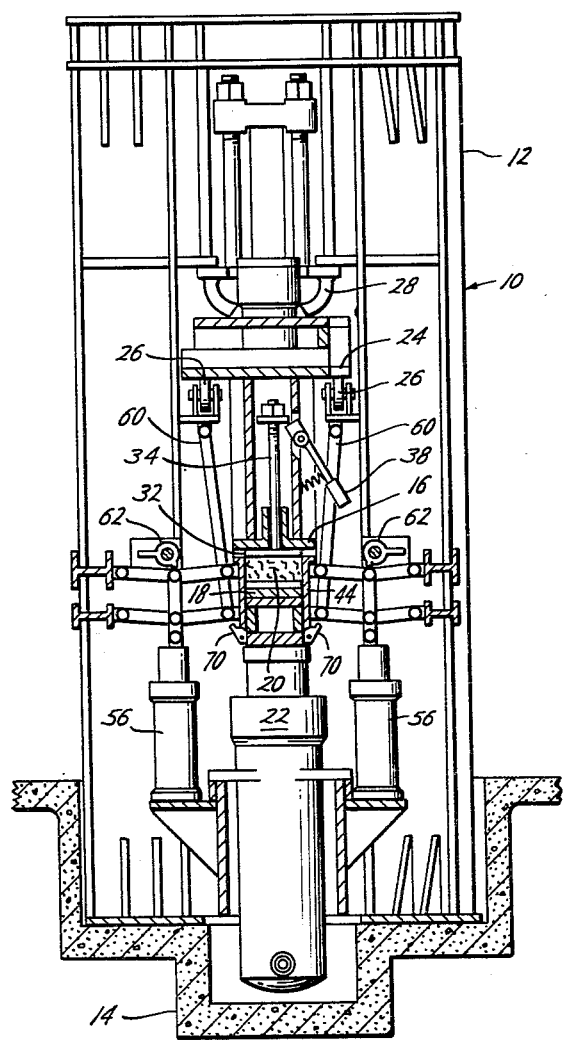
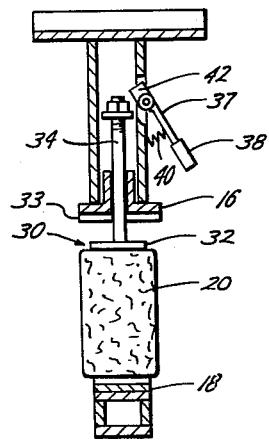
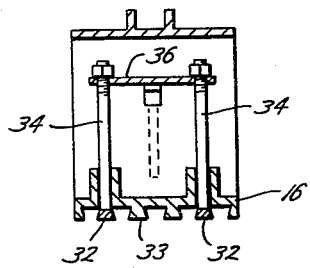
Alfred C. Sinclair
Stuart W. Sinclair
INVENTORS
BY
ATTORNEYS

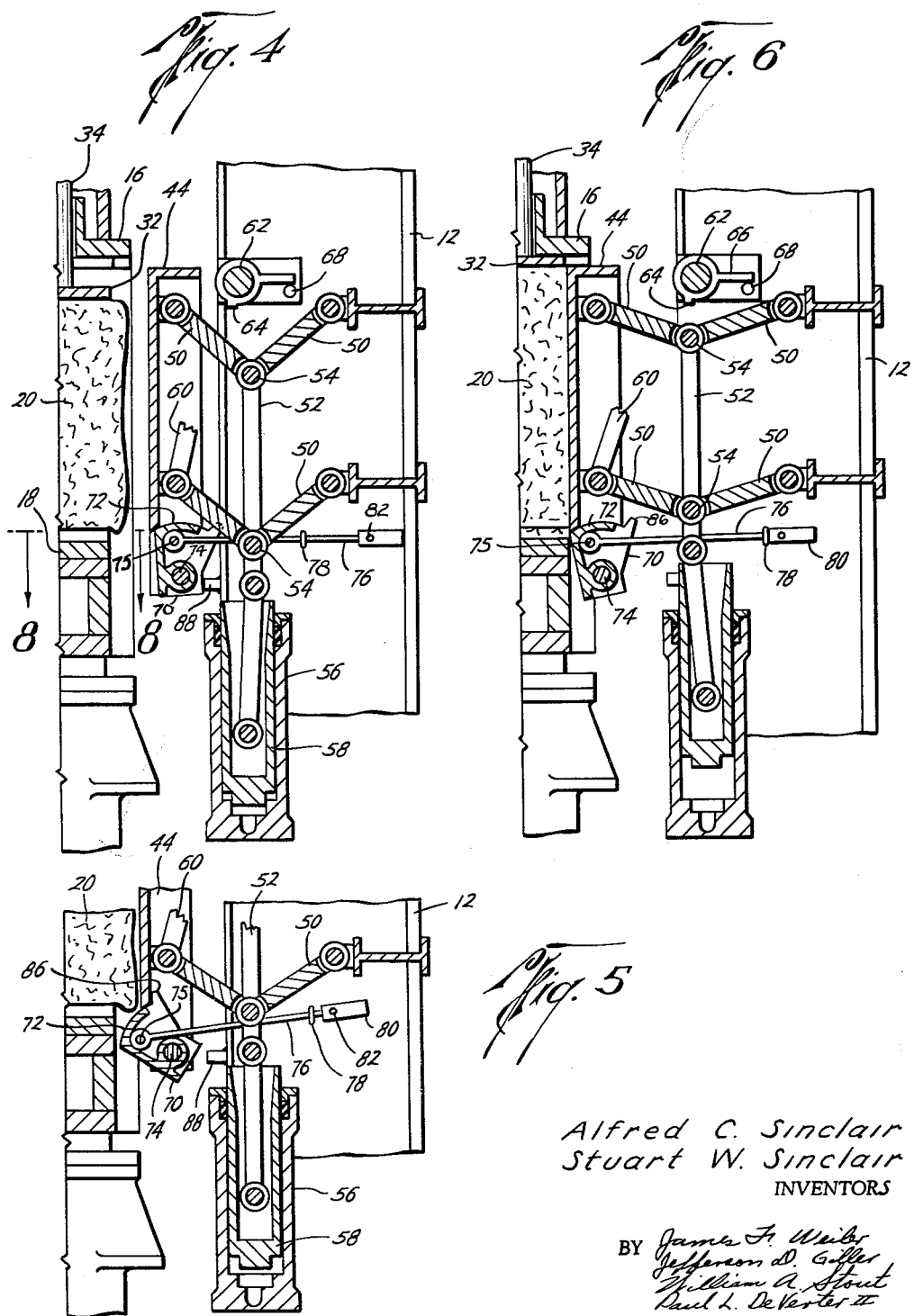

March 9, 1965 A. C. SINCLAIR ETAL 3,172,351
COTTON PRESS
Filed April 30, 1962 4 Sheets-Sheet 3
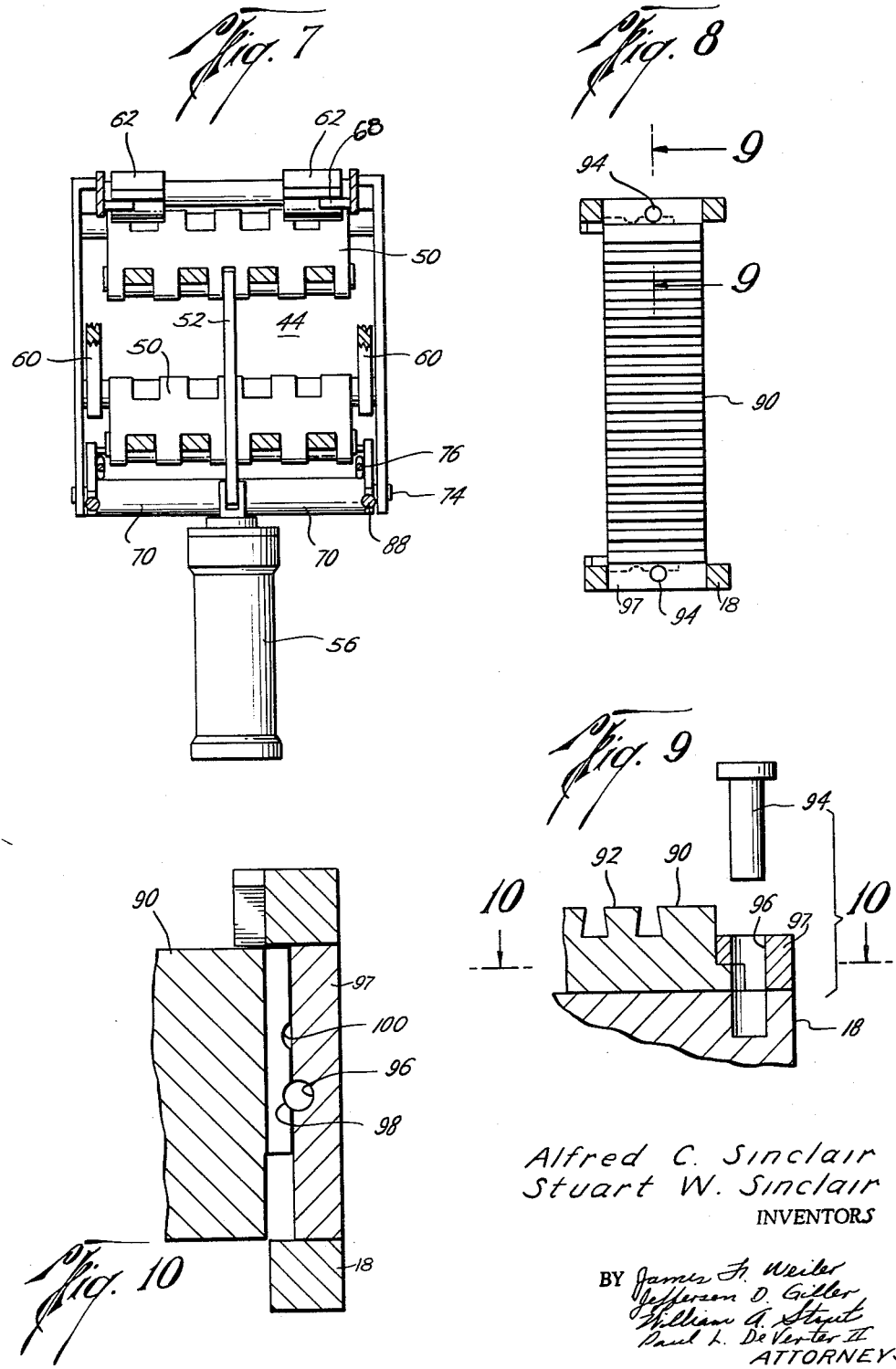
Alfred C. Sinclair
Stuart W. Sinclair
INVENTORS

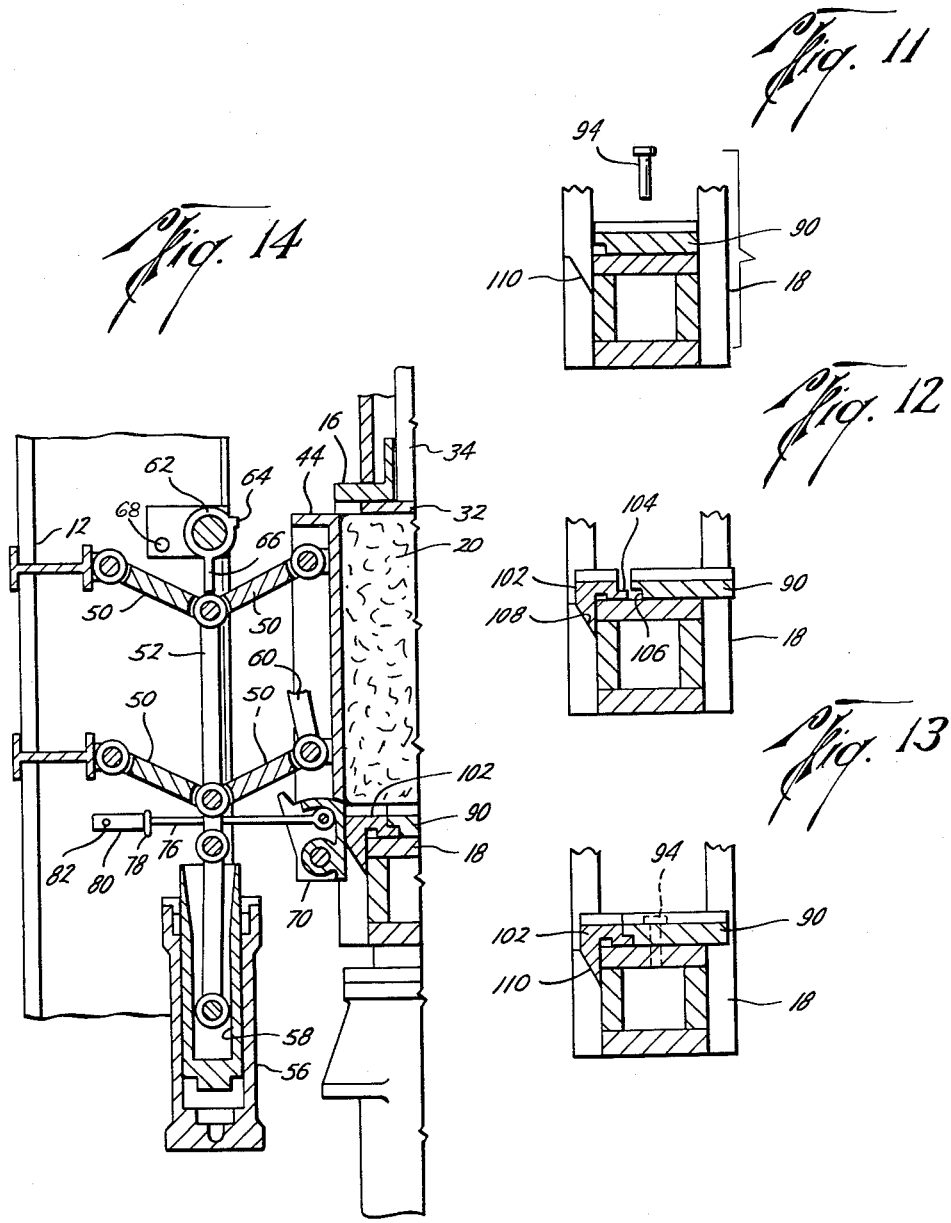

United States Patent Office 3,172,351
Patented Mar. 9, 1965

3,172,351
COTTON PRESS
Alfred C. Sinclair and Stuart W. Sinclair, Houston, Tex., assignors to Anderson, Clayton & Company, Houston, Tex., a corporation of Delaware
Filed Apr. 30, 1962, Ser. No. 191,237
7 Claims. (Cl. 100—255)

This invention relates to improvements in a cotton press and is a continuation-in-part of our copending patent application, Serial No. 758,701, filed September 3, 1958, entitled Multistage Press, now abandoned.

In order to conserve space and thus lower transportation and storage costs, bales of cotton are frequently pressed into either smaller standard density or high density bales prior to transportation or storage. Generally, in converting a bale from a lower to a higher density, the following steps are followed: loading the bale into the press between upper and lower platens, removing the bands, closing the side doors, pressing the bales, retracting the side doors, tying the bale, opening the press, and removing the bale. These operations may be performed in a single stage press or a multistage press such as disclosed in our copending application, Serial No. 758,701 may be used.

It is a general object of the present invention to provide an improved cotton press which will quickly and efficiently compress a bale of cotton to a higher density.

Yet a further object of the present invention is the provision of an improved cotton press in which a bale of cotton may be compressed to one of a multiple of specified density bales.

Yet a further object of the present invention is the provision of a bale lock which is slidably connected to the upper press platen and is adapted to drop down and engage the upper portion of the bale for locking the bale between the upper and lower platens when the platens are in the expanded position.

Yet a still further object of the present invention is the provision of a bale lock which includes a releasable latch means which locks and maintains the bale lock in latched position when the bale is compressed between the platens.

Still a further object of the present invention is the provision of a bale lock which is slidable into and forms part of the upper platen and moves out of the path of travel of the side doors.

Yet a still further object of the present invention is the provision of a cotton press including side doors which are movably supported by a pivoted link arm and include a toggle connection by which the side doors are opened and closed.

Still a further object of the present invention is the provision of a cotton press including upper and lower platens for pressing the cotton bale and including a pair of side doors movably supported on opposite sides of the platens by a link arm and toggle connection and includes adjustable stop means limiting the movement of the toggle connection thereby limiting inward movement of the side doors for pressing either standard density or high density cotton bales.

Still a further object of the present invention is the provision of a cotton press having side doors disposed adjacent opposite sides of upper and lower platens and which include bagging scrapers so that when the side doors are closed the bagging scrapers scrape the bale bagging upward above the lower platen.

A still further object of the present invention is the provision of side doors which include pivotably mounted bagging scrapers which are positioned adjacent the lower platen and which are rotated upwardly by the closing movement of the side doors so as to scrape the cotton bale bagging upwardly above the lower platen thereby allowing the side doors to coact with the lower platen without the interference of bagging.

A still further object of the present invention is the provision of a segmental plate which interlocks with the lower platen thereby increasing the width of the lower platen and including an adjustable stop means coacting with the side doors to insure that the side doors coact with the segmental plate and lower platen for providing a desired sized pressing unit.

Other and further objects, features and advantages will be apparent from the following description of a presently preferred embodiment of the invention, given for the purpose of disclosure, and taken in conjunction with the accompanying drawings, where, FIGURE 1 is an elevational view, partly in cross-section, illustrating a cotton press according to the present invention in which the bale is shown in its fully compressed position, FIGURE 2 is an elevational fragmentary view, in cross-section, illustrating the operation of the bale lock, shown in FIGURE 1, in position to hold the bale between the upper and lower platens when the platens are in their retracted position, FIGURE 3 is a cross-sectional, side elevational view of the bale lock of FIGURE 2 in position as shown in FIGURE 1, FIGURE 4 is an enlarged fragmentary, elevational view, partly in cross-section, illustrating a side door and a bagging scraper in their open position, FIGURE 5 is a view similar to that of FIGURE 4, illustrating a side door and a bagging scraper in an intermediate position, FIGURE 6 is a view similar to that of FIGURES 4 and 5 illustrating a side door and a bagging scraper in an almost closed position for pressing a high density bale, FIGURE 7 is a fragmentary side view showing the mechanical linkage for actuating one of the side doors, FIGURE 8 is a fragmentary top view showing the lower platen and its movable channel plate, FIGURE 9 is an enlarged fragmentary cross-sectional view taken along the line 9—9 of FIGURE 8, FIGURE 10 is a fragmentary, cross-sectional view taken along the line 10—10 of FIGURE 9, FIGURES 11 through 13 show the steps of adding a segmental plate to the high density channel plate on the lower platen with FIGURE 11, a fragmentary elevational view, in cross-section, showing the fastening pin being removed, FIGURE 12, a fragmentary elevational view, in cross-section, showing the high density channel plate being shifted and the segmental plate being placed in position, and FIGURE 13, a fragmentary elevational view, in cross-section, showing both plates in position and secured, and FIGURE 14 is a view similar to FIGURE 6, but showing the segmental plate in position, and the adjustable door stop arranged so that the side doors and bagging scrapers are in closed position to press a standard density bale.

Referring now to the drawings, and particularly to FIGURE 1, the reference numeral 10 generally indicates the cotton press of the present invention and generally includes a frame 12 which may be suitably supported on a concrete foundation 14, an upper platen 16, and a lower platen 18. Thus, a bale of cotton 20 may be inserted between the upper platen 16 and the lower platen 18 and suitably compressed. Any suitable means, such as the hydraulic ram and cylinder assembly 22 may be used to move the platens 16 and 18 together and to retract them. As this is a conventional structure and forms no part of the present invention, no further description is deemed necessary.

The above named cotton press components are all conventional and may be suitably incorporated in various types of cotton presses such as disclosed in our copending application, Serial No. 758,701. For example, the press shown in FIGURE 1 is shown as a multistage press. Accordingly, the pressing unit cross plate 24 is provided connected to and supporting the upper platen 16 and is adapted to be supported on frame rollers 26 in a multistage press or directly connected to the frame 12 in a single stage press. A pressing pad 28 is connected to the frame 12 provides a stop for the upper platen 16 so that in pressing the lower platen 18 upwardly, the lower platen will not move the upper platen 16 upwardly.

Thus, the upper platen 16 is supported and prevented from upward movement in the frame structure 12 and the lower platen 18 is movable toward and away from the upper platen 16 by means of the ram and cylinder assembly 22. No further detail description of these component members of the cotton press is given as any suitable cotton press may be used.

The present invention is directed to providing specific improvements in a cotton press which cooperate with the upper and lower platens 16 and 18, respectively, to suitably hold a bale of cotton 20 between the platens and to cooperate with the upper and lower platens to press the bales 20 into either standard density or high density bales of cotton.

First, referring to FIGURES 1–3, a bale lock or clamp 30 is provided for locking the bale between the upper and lower platen 16 and 18. Referring particularly to FIGURE 2, it is noted that in the initial step of pressing a cotton bale 20, the bale 20 is placed between the upper and lower platens 16 and 18 and rests on the lower platen 18. Since in this position the platens 16 and 18 are retracted from each other, the distance between the upper and lower platen 16 and 18 is greater than the height of the bale 20. It is desirable that suitable means be utilized to insure that the bale 20 will not roll off of the lower platen 18 prior to the time that it is securely gripped between the upper and lower platens. Thus, a bale lock, generally designated by the numeral 30 is provided for holding the bale 20 in place between the upper and lower platens 16 and 18 while the bands (not shown) are being removed from the bale 20. The bale lock 30 generally includes one or more bale engaging members 32, one or more arms 34 which are connected to the bale engaging members 32 and which are slidably movable through the upper platen 16, a connecting cross arm 36 which is connected to the slidable arms 34, and a releasable latch means 37 for latching the bale clamp 30 in an upward position.

Referring to FIGURE 3, it is noted that the bale engaging members 32 are similarly shaped to the upper platen ribs 33, and when in an upward position form part of the upper platen 16. Thus when in an upward position, the members 32 act as ribs so as to permit the bale baling or tying operation to be performed. The releasable latch means 37 may include a lever 38 which is pivotally connected to the upper platen 16 adjacent the cross member 36 and includes a spring 40 which tends to hold the lever 38 in an extended position. An ear 42 is provided adjacent the inner end of the lever 38, and which, when the bale engaging member 32 is in an upward position, engages the underside of the cross arm 36 to hold the bale lock 30 in an elevated position. When the lever 38 is pressed inwardly, it permits the bale lock 30 to drop to a position such as illustrated in FIGURE 2 and thereby prevents the bale 20 from rolling off of the lower platen 18. Thus when the bale 20 is inserted between the platens 16 and 18 and they are in a retracted position, the lever 38 is actuated to allow the bale engaging members 32 to drop down on the bale and hold the bale 20 in position while the bands are removed from the bale. It is noted that the bale engaging members 32 extend transversely across the bale and do not interfere with the removal of the bands (not shown). As the platens 16 and 18 are moved toward each other to compress the bale 20 the bale lock will be slidably pushed up toward the upper platen 16 until, as shown in FIGURE 3, the bale engaging members 32 engage and form part of the upper platen 16. In this position, it is noted from FIGURE 1 that the bale lock 30 will be removed from the path of travel of the side doors 44 so as not to interfere with their operation. In addition, it is noted that when the bale lock is in its upper position the ear 42 will engage the cross arm 36 and act to hold the bale lock 30 in the elevated position. Thus, at the end of the pressing operation when the platens 16 and 18 are again retracted from each other the bale lock 30 will remain in the elevated position so as to allow the released bale 20 to be removed from the cotton press.

Referring now to FIGURES 1, 4, 5, 6 and 14, a side door arrangement is provided which is so constructed and arranged so as to be used in pressing both standard density and high density bales. A pair of side doors 44 are disposed on opposite sides of the upper and lower platens 16 and 18. The side doors 44 are partially supported in position by means of a toggle arrangement which includes two pairs of toggle arms 50 extending across the back of each side door. One end of each pair of toggle arms 50 is pivotally secured to one of the side doors and the second end of each pair is pivotally secured to the frame 12 of the press. In addition, each pair of toggle arms 50 is pivoted at an intermediate point to a toggle connecting link arm 52 at a pivoted connection 54. Thus, as best seen in FIGURES 4 and 6, a toggle connecting link arm 52 is pivotally connected to two pairs of toggle arms 50 at intermediate pivot points 54 in order to move the side doors toward and away from the upper and lower platens 16 and 18 as the toggle connecting link arm 52 is reciprocated. Suitable means for actuating and retracting the toggle link arm 52 may be provided such as a hydraulic cylinder 56 and piston 58 assembly. Thus, as hydraulic pressure is applied to the hydraulic cylinder 56, a piston 58 which is connected to the toggle connecting link arm 52 is raised thereby closing the side door 44. Upon draining the hydraulic fluid from the cylinder 56, the hydraulic piston 58 moves downwardly thereby retracting the side door 44.

Also supporting the side dors 44 are a pair of link supporting arms 60 which are pivotally connected to each side of the side doors 44 and to the frame 12 of the press. These supporting link arms 60 support and allow movement of the side doors 44 toward and away from the platens 16 and 18.

FIGURE 4 shows one of the side doors 44 in its retracted position, FIGURE 5 shows it in an intermediate position, and FIGURE 6 shows the side door 44 in an almost closed position. Thus, the particular toggle arrangement provides not only suitable means for moving the doors toward and away from the upper and lower platens 16 and 18, respectively and the cotton bale 20, but also provides a mechanical leverage advantage for holding the bale 20 in position. As previously mentioned, the parts are in position in FIGURES 4–6 to press high density bales. In order to prevent the side doors from moving inwardly too far, an adjustable stop member 62 is pivotally secured to the frame 12 of the press. It is noted that the adjustable stop member 62 includes a short stop ear 64 and a long stop ear 66. As shown in FIGURES 4, 6 and 14 a pin 68 is provided to hold the adjustable stop member 62 in position so that the short stop ear 64 is positioned to contact the toggle assembly and limit the upward movement of the link arm 52 thereby limiting the inward movement of the side doors 44 for pressing a particular size bale such as a high density bale.

Referring now to FIGURE 14, it is noted that the adjustable stop member has been revolved so that the long stop ear 66 is positioned for engagement with the toggle assembly thereby limiting the upward movement of the connecting link 52 over that shown in FIGURES 4 and 6 so that the inward movement of the side doors will be less than that shown in FIGURES 4 and 6. Thus, the particular position of the adjustable stop member 62 is such that the side doors are arranged to press another and different density bale, such as the standard density bale which is larger than the high density bale.

Referring again particularly to FIGURES 4 and 6, ordinarily bagging is disposed about the cotton bale 20 which tends to overhang the sides of the lower platen 18. In order to prevent the bagging from being caught between the side doors 44 and the lower platen 18 on inward movement of the doors, a bagging scraper 70 may be provided at the lower edge of each side door. The purpose of this bagging scraper is to push or scrape the bagging upwardly during the final closing of the side doors 44. Then, when the lower platen 18 is moved upwardly the bagging is moved upwardly with the lower portion of the bale and thus its scraper prevents catching the bagging between the lower edge of the side doors and the lower platen 18 and tearing the bagging. The bagging scraper is generally indicated by the number 70 and has a face which is provided with a rounded portion 72 adjacent its upper end. The member 70 is pivotally connected to the lower end of each side door by means of a shaft 74. In addition, a generally horizontal positioning arm 76 is pivotally secured to the scraper 70 at a pivot point 75 above the shaft 74. The generally horizontally extending positioning arm 76 is slidably connected to the frame 12 by being slidable through a stop member 78 such as a ring. The scraper positioning arm 76 includes a detent or adjustable stop member 80 which is generally a tubular member having a recess catch 82 in which the free end of the positioning arm 76 may be secured. Thus, the positioning arm 76 is slidable in a generally horizontal direction to allow the scraper body 70 to move forward and position the rounded face 72 adjacent the lower platen 18. That is, as shown in FIGURE 5, the scraper body 70 tends to rotate in a counter clockwise direction to allow the rounded face 72 to fall forward and under the overhanging bagging. However, when the detent 80 contacts the stop member 78 (FIGURE 6) the movement of the rounded face 72 towards the lower platen 18 is stopped. It is to be noted that the recess catch 82 on the detent 80 is positioned nearer one end of the detent than the second end in order that it may be reversed to change the limit of travel of the positioning arm 76 and thus of the scraper 70.

Referring to FIGURE 14, it is noted that the detent 80 has been reversed and therefore prevents the scraper 70 from moving as far towards the lower platen 18 as it would in FIGURES 4-6. The purpose of the positioning link arm 76 is to allow the scraper 70 to be positioned close enough to the lower platen 18 to scrape the bagging upwardly, but to prevent wear of the scraper against the outer edge of the platen 18. That is, since the length of the positioning arm from the pivot point 75 to the detent or adjustable stop 80 is fixed for any particular size pressing operation, the position of the scraper 70 relative to the lower platen 18, as it falls counterclockwise by gravity, is limited when the detent or adjustable stop member 80 contacts the stop member or ring 78.

Since the bagging scraper 70 is pivoted to the lower edge of the side doors, the bagging scraper is moved towards and retracted from the lower platen 18 with the side doors. Referring to FIGURE 5, it is noted that as the side door 44 moves toward the lower platen 18 and cotton bale 20, the rounded face portion 72 of the scraper is tilted forwardly by gravity under the bagging and adjacent the lower platen 18. As the pivoted connection 74 by which the scraper 70 is connected to the side door 44 is in a lower position than the pivoted connection 75 to which the horizontal positioning arm is connected to the scraper, the scraper face 72 is rotated on inward movement of the door 44 and in effect scrapes upwardly along the side of the lower platen 18 to effectively push the bagging upwardly above the lower platen 18 as the bagging scraper assumes an almost vertical position as shown in FIGURE 6. That is, the transverse movement of the pivoted point 75 towards the lower platen 18 is limited by the detent member 80 contacting the stop ring 78, whereby further inward movement of the pivoted connection 74 inwardly causes a clockwise rotation of the rounded face 72 upwardly and along the side of the lower platen.

A scraping tilting limit shoulder 86 (FIGURES 5 and 6) is provided on the scraper 70 to limit the inward movement of the scraper as the doors are being closed at a time before the positioning arm 76 and detent 80 have become effective to control the inward movement of the scraper 70. And as best seen in FIGURE 4, a scraping bumper 88 is provided so that when the doors are fully retracted the bumper 88 contacts and rotates the scraper clockwise about the pivot point 74 to hold the scraper in an upright position and out of the way.

As previously mentioned, an adjustable stop 62 has been provided and an adjustable detent 80 has been provided to adjust both the movement of the side doors 44 and the positioning arm 76 of the bagging scraper 70 in order to press different size bales such as standard density and a high density bale. However, in order to have the press properly and suitably able to press two different sizes of bales, it is desirable that the pressing surface of the lower platen 18 be of specific width for pressing a certain density bale. However, no change is necessary in the upper platen 16 as its effective width is adjusted when the inward movement of the side doors 44 is adjusted by the action of the adjustable stop 62. Thus the side doors move inwardly and under the upper platen 16 and coact with it to effectively change its width. However, since the side doors 44 move up against the outside of the lower platen 18, it is desirable to suitably change the width of the lower platen 18 for coacting with the side doors 44 in order to properly compress a specific sized bale.

Referring now to FIGURES 8-10, the lower platen 18 includes a lower channel plate 90 which includes the usual transverse ribs 92. Normally, the lower channel plate 90 is centrally positioned on the lower platen 18. Thus, as shown in FIGURES 8-10, a positioning pin 94 is provided to engage each end of the lower channel plate 90 and is adapted to be inserted in a pin slot 96 in a hold down plate 97 and the lower platen 18 and also to engage one of a plurality of notches 98 and 100 in the channel plate 90. Thus, as shown, with the pin 94 in position in the pin slot 96 and engaging slot 98 of the plate 90, the lower channel plate is centrally positioned on the lower platen 18 and the platen 18 is then suitable for compressing a bale of cotton to a high density bale as shown in FIGURES 4-6.

However, when a standard density bale is desired to be pressed, the lower platen must be increased so as to properly compress a bale to a standard density size. In this case a segmental channel plate 102 (FIGURES 12, 13, and 14) should be added to the lower channel plate 90 to provide this increased width. Referring to FIGURES 8-13, the pin 94 is removed at each end of the lower channel plate 90, and the plate 90 is slidably moved across the top of the lower platen 18 in order to allow placement of the segmental plate 102. It is to be noted that the segmental plate includes a tongue 104 which coacts with a groove 106 in the channel plate 90 for holding one edge of the segmental plate 102 on the platen 18. In addition, the lower edge of the opposite side of the segmental plate 102 includes a wedge shaped portion 108 which coacts with a wedge slot 110 on the lower platen 18. Thus, the segmental plate 102 is placed in position on the lower platen 18, as shown in FIGURE 12, and the channel plate 90 is slid over the tongue 104 of the segmental plate thereby securing the plate in position on the lower platen 18 (FIGURE 13). The pin 94 is then re-inserted in the pin slot 96 as shown in FIGURE 13 and it now engages the positioning notch 100 on the lower channel plate 90 thereby transversely securing both the channel plate 90 and the added segmental plate 102 in place on the lower platen 18. Thus, as best seen in FIGURE 14, the newly added segmental plate 102 is now in position on one side of the lower platen 18 to form part of the lower platen and thus properly coact with the side doors and bagging scrapers to compress a standard density cotton bale.

Thus, the arrangement herein shown advantageously provides a cotton press which will hold and press bales of high density and standard density with a minimum of time required for making the proper adjustments from one density to another density and still insure that the bales are at all times during the process of pressing confined within the platens so that there is no possibility of the bales springing or rolling out of the platens when pressed, and that all the various components of the press are adjustably sized for pressing more than one size bale.

In operation, the cotton press 10 is suitably adjusted to press the desired size bale. For instance, assuming that a high density bale is desired to be pressed, the side door stops 62 are adjusted as shown in FIGURES 1 and 4 through 6 so that the small stop ear 64 is positioned for contact with the toggle assembly and the stop ear 66 has been rotated out of place and seated against the pin 68. Also, the bagging scrapers 70 are suitably adjusted by positioning the detent 80 on the positioning link 76 so that the recess catch 82 will be nearer the slidable stop 78 thereby allowing the maximum movement of the bagging scraper 70 towards the lower platen 18.

The lower platen 18 is properly sized by having only the lower channel plate 90 connected thereon for pressing the high density bale. The bale 20 is then loaded in the press 10 between the lower and upper platens, 18 and 16, respectively, while the platens are in a position retracted from each other. As shown in FIGURE 2, the bale lock 30 is permitted to drop down upon the bale 12 by the actuation of the lever 38 by pivoting the ear 42 from under the cross arm 36. Thus, the bale lock 30 will, by gravity, slidably drop from the upper platen 16 until the bale engaging members 32 bear against the upper part of the bale 20 and hold it securely in position between the upper and lower platens 16 and 18. As the transversely extending bale holding means 32 do not interfere with the transversely extending bands (not shown) on the bales, the bands can then be removed.

After the bands have been removed from the bale 20, the bale is ready to be pressed between the upper and lower platens 16 and 18, respectively. The bale lock 30 is moved upwardly by the bale 20 as it is being pressed and the bale engaging members 32, as best seen in FIGURES 1 and 3, become in effect part of the upper platen 16 as the bale 20 is now gripped between the upper and lower platens. Preferably, the bale gripping members 32 are shaped similarly to the upper platen ribs 33 so as to form an upper platen rib when moved against the upper platen 16. Upon upward movement of the bale lock 30 the ear 42 of the lever 38 again engages the under side of the cross arm 36 to hold the bale lock 30 in an elevated position. At this point in the pressing cycle, the bale lock 30 has performed its function, and is suitably positioned so as not to interfere with the action of the side doors 44 which when moved inwardly coact with the under side of the platen 16 to hold the cotton bale 20.

Referring now to FIGURES 4–6, the action of the side doors 44 in closing about the cotton bale 20 is best seen. Thus, as hydraulic pressure is applied to the hydraulic cylinder 56, the piston 58 which is connected to the toggle connecting link 52 is raised thereby raising the connecting link 52. The upward action of the toggle connecting link 52 causes the side doors 44 to move inwardly under the upper platen 16 and the retracted bale holding members 32 of the bale holder 30. However, as shown in FIGURE 6, the upward movement of the connecting link 52 and thus the inward movement of the side doors is limited by contact of the toggle assembly arms 50 with the adjustable stop mechanism 62. Thus the side doors 44 are positioned with reference to the upper and lower platens so as to coact with these platens in pressing a high density bale.

Since the bagging scrapers 70 are pivotally connected to the lower edge of each side door 44, they are also moved inwardly on inward movement of the side doors. As the side doors 44 reach an intermediate inward position, as best seen in FIGURE 5, the bagging scraper 70 tilts forwardly by gravity, but is retained from tilting too far by the tilt limiter 86 contacting the back of the side door 44. Also as the bagging scrapers 70 are brought adjacent to the sides of the lower platen 18 the position of the rounded face 72 is preferably positioned adjacent, but not contacting the edge of the lower platen 18 by the positioning link arm 76. The link arm 76 stops the inward horizontal movement of the bagging scrapers 70 when the detent 80, which is connected to the link arm 70, contacts the stop member 78 which is secured to the frame 12 thereby limiting the sliding movement of the positioning arm 76 through the ring stop 78 in a transverse direction. Because the pivoted connection 74 of the bagging scraper 70 to the side doors is below the pivoted connection 75, further movement of the side doors inwardly causes the rounded face 72 to rotate upwardly and scrape along the lower edge of the lower platen 18 until it assumes a generally vertical position as illustrated in FIGURE 1. During this operation, the coaction between the side doors 44 and the bagging scraper 70 pushes the loose bagging upwardly above the lower platen 18 and prevents the bagging from being caught between the side doors 44 and the lower platen 18.

The final pressing on the bale 20 may be accomplished, as best seen in FIGURE 1, wherein the lower platen 18 moves upwardly between the side doors 44 and compresses the bale 20 against the fixed upper platen 16. The pressing operation on the bale is now completed, and the side doors are retracted by draining the hydraulic fluid from the cylinder 56 thereby allowing the hydraulic piston 58 to move downwardly so that the doors may be retracted again as shown in FIGURE 4. When the side doors 44 are retracted the scraper bumper 88 contacts the lower edge of the scraper 70 and retracts it and holds it in an upright position out of the way.

At this point in the operation the bale is still compressed between the upper and lower platens and bands are then applied around the compressed bale between the openings between the ribs 33 (FIGURE 3) in the upper platen 16 and between the ribs 92 (FIGURE 9) in the lower platen 18. It is here noted that the bale holding members 32 by being retracted into and forming ribs in the upper platen 16 do not interfere with the banding process of the compressed bale. After banding, the upper and lower platens are retracted from each other. However, since at this point the releasable engaging lever means 37 (FIGURE 2) still holds the bale clamp 30 in the upward position similar to its position in FIGURE 1, bale clamp does not drop down and interfere with removing the compressed bale 20 from the cotton press.

Referring now to FIGURES 8 through 14, the cotton press 10 of the present invention can quickly be adjusted to press, instead of the high density bale, a standard density bale. Thus, the pressing width of the lower platen 18 may be increased by removing the positioning pin 94, slidably moving the channel plate 90 on the lower platen over, and placing the segmental plate 102 in position. The lower channel plate 90 is then partially moved back so that the groove 106 engages and retains the tongue 104 of the segmental plate 102. In addition, the wedge 108 of the segmental plate seats on the wedge slot 110 in the lower platen 18. The positioning pin 94 is then replaced in the platen slot 96 and engages the positioning notch 100 instead of notch 98 and transversely secures the lower channel plate 90 and the segmental plate 102 on the lower platen 18.

Referring to FIGURE 14, the adjustable stop 62 is revolved so that the longer stop ear 66 is in position to engage the toggle assembly and stop the upward travel of the connecting link 52 whereby the side doors 44 will travel inwardly only a sufficient distance to coact with the new enlarged pressing area of the lower platen 18 to form the correct area for pressing a standard density bale.

Also, and still referring to FIGURE 14, the detent 80 has been reversed on the position link 76 in order to insure that the maximum inward position of the bagging scraper 70 will be correctly positioned with reference to the now enlarged lower platen pressing area. The scrapers 70 now coact with the combined segmental plate 102 and channel plate 90 to scrape the bagging up above the top of the lower platen 18. The operation of the cotton press 10 with the parts as now adjusted is the same as previously indicated for the high density bale.

Thus the present improvement in the bale lock, the toggle action of the side doors, the bagging scrapers, and the segmental plate are particularly well suited to improve the safety and operation of compressing a bale of cotton. In addition, the above named improvements may be utilized with a single press unit or a multiple press unit for pressing either standard density or high density bales with a simple and quick changeover from one to another.

The present invention, therefore, is well suited and adapted to attain the objects and ends and has the advantages and features mentioned as well as others inherent therein. While a presently-preferred embodiment of the invention has been given for the purpose of disclosure, other and further uses thereof will occur to those in the art in which the invention may be used and changes and arrangements of parts may be made which are within the spirit of the invention and the scope of the appended claims.

What is claimed is:

1. In a cotton press having a frame and including an upper and lower platen, the improvement comprising,
    (a) a pair of side doors, one door disposed on one side of said platens and the second door disposed on the opposite side of said platens,
    (b) a link supporting arm pivotally connecting and supporting the side doors from the frame for movement of the doors toward and away from said platens,
    (c) a toggle assembly pivotally connected to each side door and to said frame,
    (d) a pivoted connection in each toggle assembly between said frame and one of said side doors,
    (e) a toggle connecting link connected to the toggle assembly at the pivoted connection,
    (f) means connected to the toggle connecting link for actuating and retracting the toggle connecting link thereby closing and opening said side doors,
    (g) a bagging scraper pivotally connected to the lower end of each side door,
    (h) a scraper limiting arm pivotally connected to each bagging scraper and to the frame to position the scraper adjacent the lower platen whereby on inward movement of the side doors said bagging scrapers scrape upwardly along the side of the lower platen,
    (i) a bale engaging member slidably connected to the upper platen for holding a bale of cotton between the upper and lower platens when the platens are retracted from each other, and
    (j) a releasable latch means latching the bale engaging member in an upward position when the bale is compressed by the platens.

2. In a cotton press having a frame and including an upper and lower platen the improvement comprising,
    (a) a pair of side doors, one side door disposed on one side of the platens and the second side door disposed on the opposite side of said platens,
    (b) a link arm pivotally connected to each of the side doors and to the frame for supporting the side doors from the frame for movement toward and away from said platens,
    (c) two pairs of toggle arms, each pair being pivotally connected together, the end of one arm of each pair of toggle arms being pivotally connected to a side door and the second end of each pair of the toggle arms being pivotally connected to the frame,
    (d) a toggle connecting link connected to each pair of toggle arms at their pivoted connection to each other,
    (e) means for moving and retracting said connecting link thereby closing and opening said side doors, and stop means positioned to contact said toggle arms thereby limiting the inward movement of the side doors.

3. The invention of claim 2 including,
    (a) a bagging scraper pivotally connected to the lower end of each side door, said bagging scraper extending along the lower end of said side door,
    (b) a scraper limiting arm pivotally connected to each bagging scraper and slidably connected to the frame, said limiting arm being of a length to position the scraper adjacent the lower platen so that on inward movement of the side doors the bagging scrapers scrape upwardly along the side of the lower platen.

4. The invention of claim 2 including a bale clamp for holding the bale on the lower platen until the bale is gripped between the upper and lower platens, comprising.
    (a) a bale engaging member positioned between the upper and lower platens and arranged to drop down on the bale,
    (b) a slidable support member connected to the bale engaging member and slidably passing through the upper platen, and,
    (c) a latch means engaging the support member for holding the support member and bale engaging member up against the upper platen.

5. The invention of claim 2 including,
    (a) a segmental channel plate interlocking with the lower platen thereby increasing the width of the lower platen,
    (b) and stop means positioned to engage the side door toggle arms for limiting the inward position of the side doors so that they coact with the combined segmental channel plate and interlocking lower platen.

6. In a cotton press having a frame and including an upper and lower platen the improvement comprising,
    (a) a pair of side doors, one disposed on the first side and the second disposed on the opposite side of said platens,
    (b) a link supporting arm pivotally connected to and supporting the side doors from the frame for movement toward and away from said platens,
    (c) a side door toggle assembly pivotally connected to each side door and pivotally connected to said frame,
    (d) a pivoted connection in each toggle assembly between said frame and one of said side doors,
    (e) a toggle connecting link connected to the toggle assembly at the pivoted connection,
    (f) means connected to the toggle connecting link for moving and retracting said connecting link thereby closing and opening said side door,
    (g) a bagging scraper pivotally connected to the lower end of each side door, (h) a scraper limiting arm pivotally connected to each bagging scraper and above the pivoted connection of the bagging scraper to the side door, said limiting arm being slidably connected to said frame so as to position the top of the scraper adjacent the lower platen on inward movement of the side doors whereby said bagging scrapers will scrape upwardly adjacent the side of the lower platen on inward movement of the side doors, and (i) a bale engaging member slidably connected to the upper platen for holding a bale of cotton between the upper and lower platens when the platens are retracted from each other, said bale engaging member positioned to be retracted into the upper platen when the cotton between the platens is compressed thereby removing the bale engaging member from the path of travel of the side doors.

(j) and releasable latch means latching the bale engaging member in an upward position when the bale is pressed against the upper platen.

7. In a cotton press having a frame and including an upper and lower platen and side doors, said platens including a plurality of transversely extending ribs spaced from each other, the improvement in a bale clamp for holding a bale of cotton between the upper and lower platens when the platens are retracted from each other comprising, a bale engaging member positioned between the upper and lower platens for holding a bale of cotton between the upper and lower platens when the platens are retracted from each other, said bale engaging member being shaped similarly to one of said ribs and positioned to be retracted into the upper platen when the cotton between the platens is compressed and spaced parallel to but spaced from said ribs, a support member connected to said engaging member and slidably extending through said upper platen, releasable latch means normally engaging the support member for holding the support member and the bale engaging member up against the upper platen, but allowing the bale engaging member to move downwardly by gravity and engage a cotton bale when the latch is released.

References Cited by the Examiner
UNITED STATES PATENTS

| | | | |
|---|---|---|---|
| 185,070 | 12/76 | Boardman | 100—295 X |
| 900,566 | 10/08 | Means | 100—223 |
| 1,196,491 | 8/16 | Street | 100—255 X |
| 1,666,020 | 4/28 | Menne | 100—295 X |
| 2,045,047 | 6/36 | Nevitt | 100—295 |
| 2,136,147 | 11/38 | Muirhead | 100—255 |
| 2,195,277 | 3/40 | Kleinman | 100—295 X |
| 2,241,063 | 5/41 | Grimes et al. | 100—255 |
| 2,834,504 | 5/58 | Annicq | 100—255 X |
| 2,971,565 | 2/61 | Jarund | 100—295 |

WALTER A. SCHEEL, *Primary Examiner.*

J. S. REICH, CHARLES A. WILLMUTH, *Examiners.*